United States Patent
Han et al.

(10) Patent No.: US 8,398,843 B2
(45) Date of Patent: Mar. 19, 2013

(54) MICROFLUIDIC DEVICE FOR ELECTROCHEMICALLY REGULATING THE PH OF A FLUID THEREIN USING SEMICONDUCTOR DOPED WITH IMPURITY AND METHOD OF REGULATING THE PH OF A FLUID IN A MICROFLUIDIC DEVICE USING THE SAME

(75) Inventors: Jung-im Han, Seoul (KR); Joon-ho Kim, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 122 days.

(21) Appl. No.: 12/913,044

(22) Filed: Oct. 27, 2010

(65) Prior Publication Data

US 2011/0048966 A1    Mar. 3, 2011

Related U.S. Application Data

(62) Division of application No. 11/534,450, filed on Sep. 22, 2006.

(30) Foreign Application Priority Data

Sep. 22, 2006   (KR) .................. 10-2005-0091198

(51) Int. Cl.
*G01N 27/28* (2006.01)
*G01N 27/40* (2006.01)

(52) U.S. Cl. ............................... 205/746; 204/252

(58) Field of Classification Search .............. 204/260, 204/228.6, 196.12, 193, 194, 400, 433, 403.03, 204/252; 422/99, 100, 72, 63, 64; 435/283.1; 427/230; 137/830–842, 601.01–602; 205/746, 205/703, 770

See application file for complete search history.

(56) References Cited

U.S. PATENT DOCUMENTS

| | | | |
|---|---|---|---|
| 5,164,062 A | 11/1992 | Byrd et al. | |
| 5,900,127 A | 5/1999 | Iida et al. | |
| 7,537,679 B2 * | 5/2009 | Sibbett | 204/450 |
| 2003/0127329 A1 | 7/2003 | DeVoe et al. | |
| 2006/0000548 A1 | 1/2006 | Morse et al. | |

FOREIGN PATENT DOCUMENTS

WO   9822813 A1   5/1998

OTHER PUBLICATIONS

Huang et al., Sensor and Actuators, 2001, 89, 242-249.*
Peter Wilding, et al. "Integrated Cell Isolation and Polymerase Chain Reaction Analysis Using Silicon Microfilter Chambers"; Analytical Biochemistry 257, pp. 95-100 (1998); Article No. AB972530; Received Aug. 28, 1997.

* cited by examiner

*Primary Examiner* — Alex Noguerola
*Assistant Examiner* — Gurpreet Kaur
(74) *Attorney, Agent, or Firm* — Cantor Colburn LLP

(57) ABSTRACT

Provided is a microfluidic device for electrochemically regulating the pH of a fluid comprising: a cathode substrate; an anode substrate facing the cathode substrate and forming a reaction chamber with the cathode substrate; and a nonconductor which forms a boundary between the portions of the cathode substrate and the anode substrate that are capable of contacting one another, wherein at least one of the cathode substrate and the anode substrate is a semiconductor doped with impurities and the other is a metal electrode.

12 Claims, 6 Drawing Sheets

MICROFLUIDIC DEVICE FOR ELECTROCHEMICALLY REGULATING THE PH OF A FLUID THEREIN USING SEMICONDUCTOR DOPED WITH IMPURITY AND METHOD OF REGULATING THE PH OF A FLUID IN A MICROFLUIDIC DEVICE USING THE SAME

CROSS-REFERENCE TO RELATED PATENT APPLICATION

This application is a divisional application of U.S. patent application Ser. No. 11/534,450 filed on Sep. 22, 2006, which claims the benefit of Korean Patent Application No. 10-2005-0091198, filed on Sep. 29, 2005, in the Korean Intellectual Property Office, the disclosure of which is incorporated herein in its entirety by reference.

BACKGROUND OF THE INVENTION

1. Field of the Invention

The present invention relates to a microfluidic device for electrochemically regulating the pH of a fluid therein and a method of regulating the pH of a fluid in the microfluidic device.

2. Description of the Related Art

Microfluidic devices are devices in which an inlet, an outlet, a reaction chamber, or the like are interconnected through microchannels. In addition to the microchannels, a micropump for inducing the flow of fluid, a micromixer for mixing fluids, and a microfilter for filtering fluids, are included in microfluidic devices.

Such devices are widely known in the field and are used in micro-analytic devices, such as a lab-on-a-chip (LOC) that performs a series of biological analytic processes including cell enrichment in samples, cytolysis, purification of biomolecules, amplification and separation of nucleic acids such as a polymerase chain reaction (PCR), and protein separation, hybridization and detection.

The pH levels required to perform each of these biological analytic processes are varied. One such biological analysis process is a conventional pH regulating process that involves adding or removing an acidic solution, a neutral solution, or a buffer solution. However, when adding or removing a pH-adjusting solution to or from a microfluidic device, additional devices and procedures are performed which lead to problems with dilution. Additional devices and procedures can be a serious problem in the microfluidic device when dealing with microscale volumes. Dilution can be a problem when a sample is collected or amplified. Furthermore, the added pH-adjusting material may inhibit subsequent biological analytical processes. In this case, the pH-adjusting material has to be removed.

A method of adjusting the pH using electrolysis is a possible solution to the above conventional problems associated with the injecting pH-adjusting reagent. For example, the pH can be adjusted using an electrolysis device that comprises an anode chamber, a cathode chamber with a membrane that is disposed between the anode and cathode chambers. FIG. 1 is a side sectional view of a conventional microfluidic device for electrochemically regulating the pH of a fluid. In FIG. 1, the conventional microfluidic device includes a cathode 11, an anode 13 and a membrane 15 between the cathode 11 and the anode 13. In the conventional microfluidic device illustrated in FIG. 1, a conducting wire should be additionally installed from the reaction chamber to electrically connect the cathode 11 and the anode 13 to a power supply device 17. However, such electrical connections can limit the miniaturization of the microfluidic device, thereby complicating the manufacturing process, and increasing the costs for manufacturing the microfluidic device.

Meanwhile, micro-structures capable of adsorbing or binding cells are known in the art. Examples of such microstructures include porous structures, pillar structures, and sieve structures. A porous structure is disclosed in ANALYTICAL BIOCHEMISTRY 257, 95-100 (1998), Integrated Cell Isolation and Polymerase Chain Reaction Analysis Using Silicon Microfilter Chambers by Peter Wilding.

In a microfluidic device used for a lab-on-a-chip, integration between organizations and functions are important for the automated analysis of the entire process. However, integration between regulating the pH and adsorbing or binding cells has not been tried.

SUMMARY OF THE INVENTION

The present invention provides a microfluidic device for electrochemically regulating the pH of a fluid therein.

The present invention also provides a method of regulating the pH of a fluid in the microfluidic device by electrolysis using the microfluidic device.

According to an aspect of the present invention, there is provided a microfluidic device for electrochemically regulating the pH of a fluid, the microfluidic device including: a cathode substrate; an anode substrate facing the cathode substrate, wherein the anode substrate and the cathode substrate form a reaction chamber. The microfluidic device further comprises a nonconductor which serves as a boundary between the cathode substrate and the anode substrate, wherein at least one of the cathode substrate and the anode substrate is a semiconductor doped with impurities and the other is a metal electrode.

The microfluidic device can be used for cytolysis. The microfluidic device for cytolysis includes a cathode substrate which is a semiconductor doped with impurities; an anode substrate which is a semiconductor doped with impurities or a metal electrode, wherein the anode substrate faces the cathode substrate and forms a reaction chamber with the cathode substrate. The microfluidic device further comprises a nonconductor, which serves as a boundary between the cathode substrate and the anode substrate, wherein a microstructure capable of adsorbing biomolecular materials is formed on the cathode substrate inside the reaction chamber.

According to another aspect of the present invention, there is provided a method of electrochemically regulating the pH of a fluid in the microfluidic device including injecting a solution containing ions having a lower or higher standard oxidation potential than water and ions having a lower standard reduction potential than water into a reaction chamber; applying a voltage through the anode substrate and the cathode substrate and inducing electrolysis in the reaction chamber; and regulating the pH of a solution in the reaction chamber.

According to another aspect of the present invention, there is provided a method of electrochemically regulating the pH of a fluid in the microfluidic device including injecting a solution containing ions having a lower or higher standard oxidation potential than water into an anode chamber; injecting a solution containing ions having a lower standard reduction potential than water into a cathode chamber; applying a voltage through the anode substrate and the cathode substrate and inducing electrolysis in the anode chamber and the cathode chamber; and regulating the pH of a solution in the anode or cathode chamber.

BRIEF DESCRIPTION OF THE DRAWINGS

The aforementioned features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings.

Figure 1:
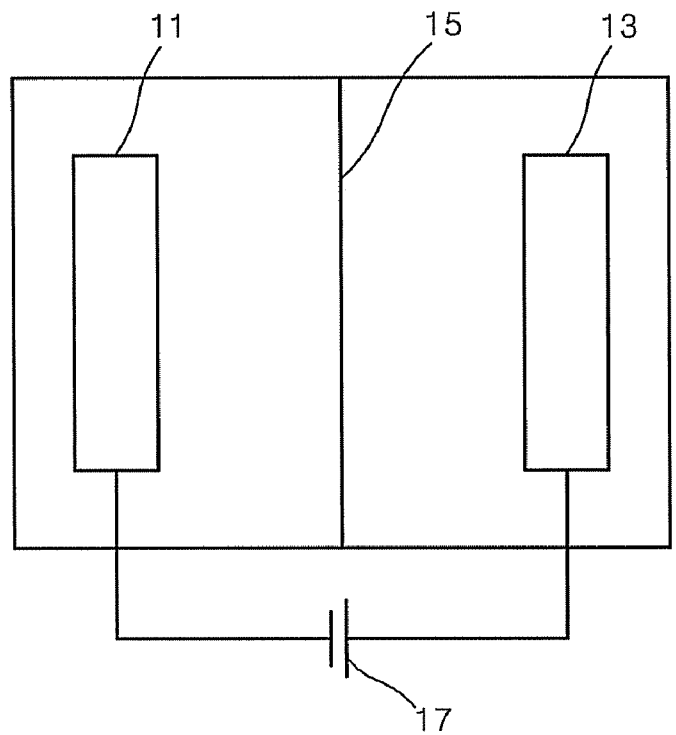
FIG. 1 is a side sectional view of a conventional microfluidic device for electrochemically regulating the pH of a fluid therein.
Figure 2:
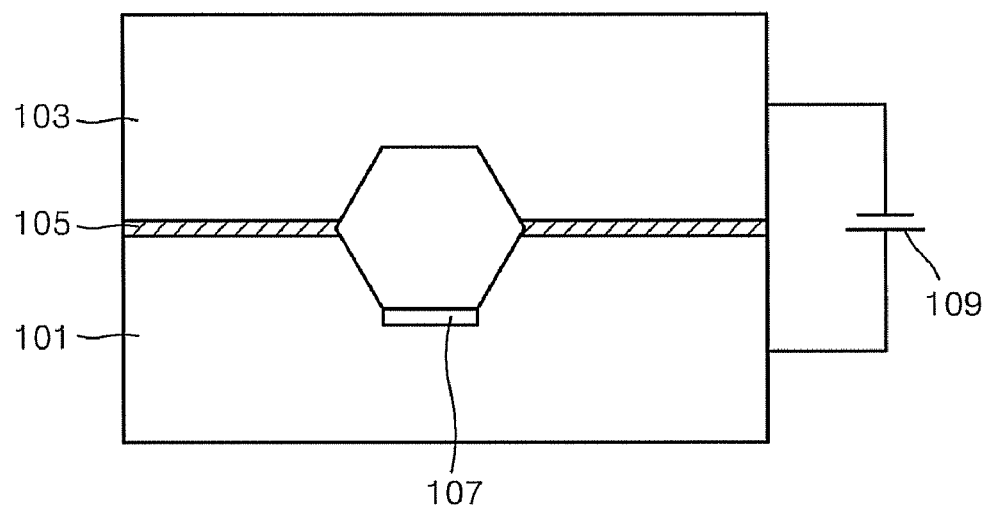
FIG. 2 is a side sectional view of a microfluidic device according to an embodiment of the present invention.

FIG. 2 is a side sectional view of a microfluidic device for electrically regulating the pH of a fluid therein according to an embodiment of the present invention.

Referring to FIG. 2, the microfluidic device includes a cathode substrate 101, an anode substrate 103 facing the cathode substrate 101 and forming a reaction chamber with the cathode substrate 101, and a nonconductor 105 forming a boundary between the cathode substrate 101 and the anode substrate 103, wherein at least one of the cathode substrate 101 and the anode substrate 103 is a semiconductor doped with impurities and the other is a metal electrode.

The cathode substrate 101 and the anode substrate 103 are electrically connected to an external power supply device 109.

The cathode substrate 101 or the anode substrate 103, which is a semiconductor doped with impurities, has advantages in that the cathode substrate 101 and the anode substrate 103 act as electrodes, and thus additional electrodes are not desirable and an electrical connection between the electrodes inside of the chamber and the external power supply device 109 is not desirable. Accordingly, the microfluidic device can be miniaturized, the manufacturing process can be simplified, the problem of leakage in the reaction chamber can be resolved and costs for manufacturing the microfluidic device can be reduced.

The semiconductor doped with impurities used to form the cathode substrate 101 or the anode substrate 103 can be an element of group XIV and the impurities can be composed of an element of group XIII or group XV. In particular, the cathode substrate 101 or the anode substrate 103 can be formed of n-type silicon or p-type silicon.

Figure 3:
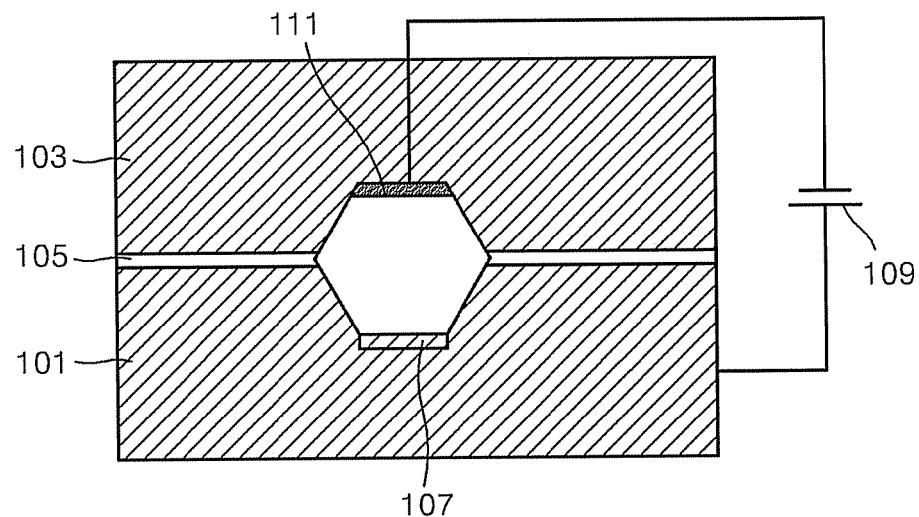
FIG. 3 is a side sectional view of a microfluidic device according to another embodiment of the present invention.

FIG. 3 is a side sectional view of a microfluidic device according to another embodiment of the present invention.

Referring now to FIG. 3, the structures of the microfluidic device and an anode substrate 103 of the microfluidic device are different from those illustrated in FIG. 2, and the electrical connection of an external power supply device 109 is also different. That is, the anode substrate 103 can be a nonconductor including an anode 111 of platinum, gold, copper, aluminum and palladium or titanium inside of the reaction chamber. If the anode 111 is formed of copper, the generation of poisonous chlorine gas can be decreased by forming $CuCl_2$ when chloride ions in a compound such as NaCl are included in the reaction chamber.

On the other hand, referring to the microfluidic device illustrated in FIG. 3, the anode substrate 103 can be composed of a semiconductor doped with impurities and a cathode substrate 101 can be a nonconductor including a cathode of platinum, gold, copper, aluminum palladium or titanium inside of the reaction chamber. When the cathode is formed of palladium, hydrogen gas generated in the cathode chambers adsorbed, and thus a gas removing process is unnecessary.

Figure 4:
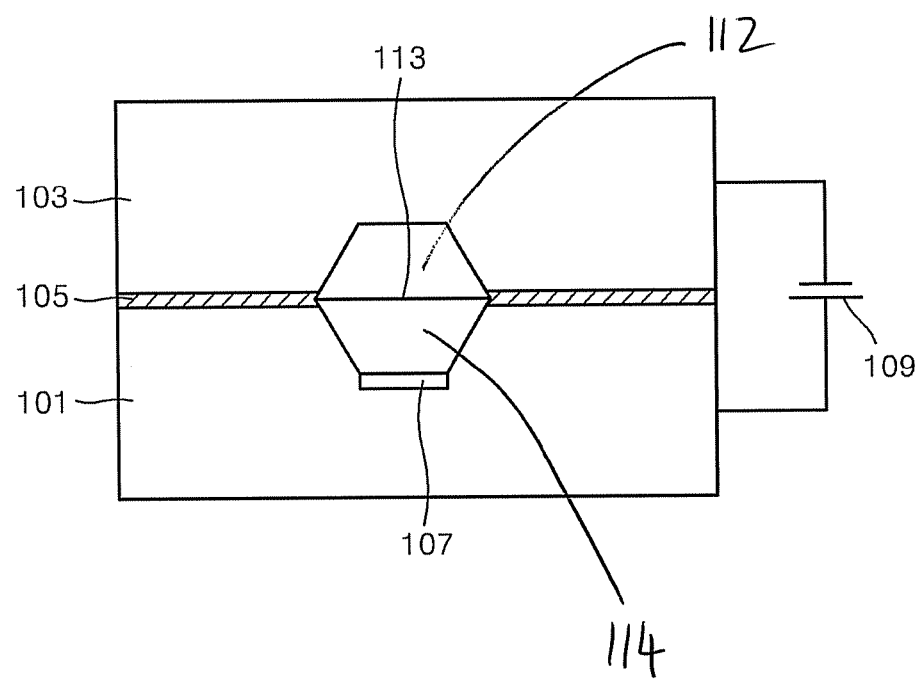
FIG. 4 is a side sectional view of a microfluidic device according to another embodiment of the present invention.

FIG. 4 is a side sectional view of a microfluidic device according to another embodiment of the present invention.

The reaction chamber of the microfluidic device of FIG. 4 includes an ion exchange membrane 113, and thus the reaction chamber is divided into a cathode chamber and an anode chamber by the ion exchange membrane 113, which is different from the microfluidic device of FIG. 2. In the FIG. 4, the anode chamber is listed as 112, while the cathode chamber is listed as 114.

The reaction chamber created between the anode and the cathode are capable of containing materials such as a fluid, and may be microchambers having a volume of microunits or less. The reaction chambers can be at least one of a chamber for concentrating cells, a chamber for lysing cells, a chamber for separating/purifying nucleic acids, a chamber for amplifying nucleic acids, a chamber for hybridizing nucleic acids and a chamber for detecting signals. The reaction chambers can be interconnected to various other chambers through microchannels. Thus, the microfluidic device according to the current embodiment of the present invention can be a lab-on-a-chip (LOC) electrochemically regulating the pH of the fluid.

When the reaction chambers are chambers for lysing cells, the microfluidic device includes a cathode substrate which is a semiconductor doped with impurities; an anode substrate which is a semiconductor doped with impurities or a metal electrode, facing the cathode substrate and forming a reaction chamber with the cathode substrate. The microfluidic device further includes a nonconductor which is a boundary between the cathode substrate and the anode substrate, wherein a microstructure capable of adsorbing biomolecular materials is formed inside the chamber of the cathode substrate.

The current passes through the ion exchange materials, but the ions and/or gas generated by the electrolysis cannot pass through the ion exchange materials. The ion exchange materials may promote passage of the electrical current applied between the anode substrate and the cathode substrate, but may not permit passage of hydrogen ions and hydroxide ions and/or gas.

The ion exchange membrane can be a positive or negative metal ion exchange membrane.

The metal ion exchange membrane may be an alkali metal ion exchange membrane. The positive ion exchange membrane passes positive ions but displays almost 100% resistance to negative ions. The negative ion exchange membrane passes negative ions but displays almost 100% resistance to positive ions. For example, the positive ion exchange membrane may include a strong acid exchange membrane of Nafion containing the functional group of $—SO^{3-}$ or a weak acid exchange membrane containing the functional group $—COO^-$, and the negative ion exchange membrane may include a strong base exchange membrane comprising the functional group of $N^+(CH_3)$ or a weak base exchange membrane comprising the functional group of $N(CH_3)_2$. The positive and negative ion exchange membranes are well known in the field and can easily be obtained. For example, the positive and negative ion exchange membranes may be obtained from NAFION™ (Dupont), DOWEZ™ (Aldrich), and DIAION™ (Aldrich).

In an embodiment of the present invention, a solution containing ions that has a lower or higher standard oxidation potential than water, which is an electrolyte for electrolysis is deposited in the reaction chamber or the anode chamber of the microfluidic device of an embodiment of the present invention. The ions having a lower standard oxidation potential than water may contain at least one ionic compound among $NO_3^-$, $F^-$, $SO_4^{2-}$, $PO_4^{3-}$, and $CO_3^{2-}$ or the like, and the ions having a higher standard oxidation potential than water may contain an electrolyte including $Cl^-$ ions, but the ionic compound is not limited thereto. When the solution of the reaction or anode chamber is composed of a compound having a lower standard oxidation potential than water, oxygen gas and hydrogen ions are generated in the reaction chamber or the anode electrode in the anode chamber as a result of the electrolysis of water. Then, pH levels around the anode electrode in the reaction chamber or of the anode chamber decrease due to the presence of hydrogen ions. $Cl^-$, which has a higher standard oxidation potential than water can only be used for the purpose of cytolysis.

In another embodiment of the present invention, a solution containing ions having a lower standard reduction potential than water is deposited into the reaction chamber or the cathode chamber of the microfluidic device of another embodiment of the present invention. The ions may be $Li^+$, $Na^+$, $K^+$, $Ca^{2+}$, $Mg^{2+}$ or $Al^{3+}$ or the like, but are not limited thereto. When electrolysis using the microfluidic device is performed, hydrogen gas and hydroxide ions are generated in the reaction chamber or the cathode electrode in the cathode chamber as a result of the electrolysis of water. Then, pH levels around the cathode electrode in the cathode chamber increase due to the presence of the hydroxide ions.

In FIGS. 2 through 4, a microstructure 107 capable of adsorbing biomolecular materials can be formed inside the chamber of the cathode substrate 101 or the anode substrate 103 in the microfluidic device for electrochemically regulating the pH of a fluid therein.

The biomolecular material can be one of DNA, RNA, peptide, protein, bacteria and a virus.

The microstructure 107 capable of adsorbing biomolecular materials can be one of a pillar structure, a sieve structure and a porous structure.

Figure 5:
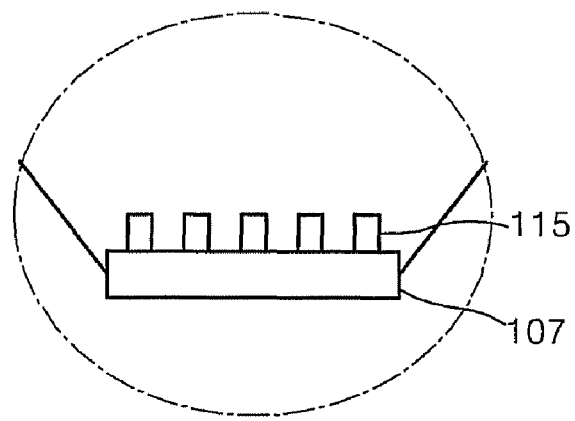
FIG. 5 is a side sectional view of a micro-structure formed inside the chamber of a cathode substrate of the microfluidic device of FIG. 4.
Figure 6:
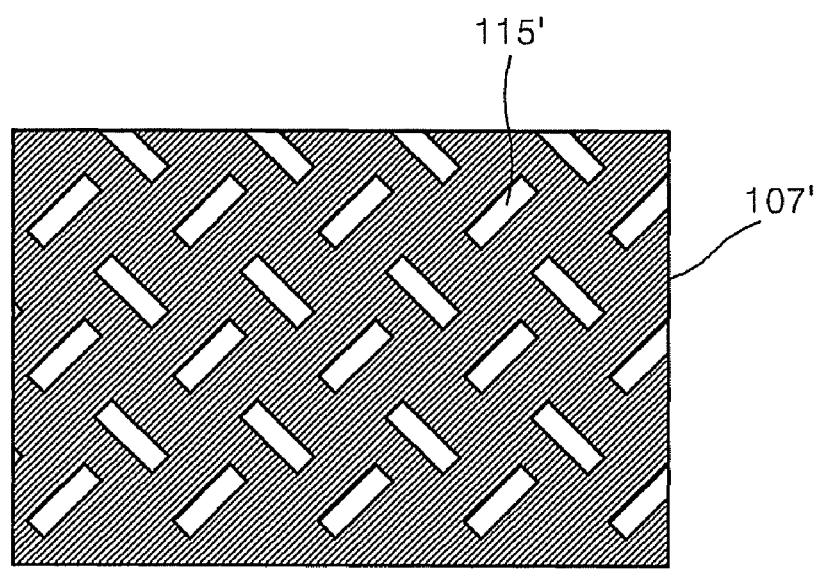
FIG. 6 is an upper side view of a micro-structure formed inside the chamber of a cathode substrate of the microfluidic device of FIG. 4.

FIG. 5 is a side sectional view of a microstructure 107 formed inside the chamber of the cathode substrate of the microfluidic device of FIG. 4. FIG. 6 is a side sectional view of a microstructure 107' formed inside the chamber of the cathode substrate of the microfluidic device of FIG. 4.

In the FIGS. 5 and 6, the microstructures 107 and 107' capable of adsorbing biomolecular materials are pillar structures 115 and 115' respectively.

The microfluidic device including the microstructure 107 capable of adsorbing biomolecular materials has the advantage of being capable of integrating its functions of regulating the pH in the chamber while at the same time concentrating biomolecular materials.

In addition, the microstructure 107 can easily be formed inside the chamber of the cathode substrate 101 using a conventional semiconductor manufacturing process thereby permitting inexpensive and cost effective manufacturing of the microfluidic device.

The cathode or anode substrate may further include a gas outlet. Through the gas outlet, oxygen gas or hydrogen gas can be discharged out of the chamber.

The cathode or anode substrate may further include an inlet and outlet through which liquid flows in and out. The inlet and outlet do not need to be installed separately and one port can be used as both the inlet and outlet at the same time. The gas outlet can also be used as the liquid inlet and outlet. For purposes of this disclosure, liquids and gases are described as fluids.

The cathode and anode chambers may further include a micropump by which fluid flows in and out.

Referring to the FIGS. 2 and 3, a method of electrochemically regulating the pH of a fluid in the microfluidic device using electrolysis wherein the reaction chamber does not include an ion exchange membrane includes injecting a solution containing ions having a lower or higher standard oxidation potential than water and further injecting ions having a lower standard reduction potential than water into the reaction chamber; applying voltages through the anode substrate 103 and the cathode substrate 101 and inducing electrolysis in the reaction chamber; and regulating the pH of the solution in the reaction chamber.

Referring to FIG. 4, a method of electrochemically regulating the pH of a fluid in the microfluidic device using electrolysis wherein the reaction chamber includes an ion exchange membrane includes injecting a solution containing ions having a lower or higher standard oxidation potential than water into an anode chamber; injecting a solution containing ions having a lower standard reduction potential than water into a cathode chamber; applying a voltage through the anode substrate 103 and the cathode substrate 101 and inducing electrolysis in the anode chamber and the cathode chamber; and regulating the pH of the solution in the anode or cathode chamber.

The solution may include biomolecular materials, and the method may further include adsorbing and concentrating biomolecular materials in the microstructure formed in the cathode substrate 101. The microstructure formed in the cathode substrate 101 is capable of adsorbing biomolecular materials even before applying the voltage. Even when the reaction chamber does not include the ion exchange membrane, the pH of the solution around the adsorbed biomolecular materials can be sufficiently regulated.

The examples of negative ions having a lower or a higher standard oxidation potential than water and positive ions having a lower standard reduction potential than water are described above.

The regulation of the pH may depend on the direction, magnitude and period of the applied voltage, or the width of the electrodes or the intervals between chambers. The direction, magnitude and period of the applied voltage, the width of the electrodes or the intervals between chambers can vary according to the pH or the volume of the chamber, which can easily be adjusted by those skilled in the art.

When a sample solution including sodium chloride (NaCl), which is generally included in bio sample solutions is added into the anode and cathode and electrolysis is performed, chloride ions are electrolyzed instead of water thereby generating chlorine gas. Thus, a smaller number of hydrogen ions are generated than the number of hydroxide ions generated at the cathode. The difference between the amount of hydrogen ions and hydroxide ions is caused by reactions between chlorine gas and water and can be varied according to conditions of chlorine gas. This makes it difficult to regulate the pH. To solve those problems, a compound having a lower standard oxidation potential than water and/or a compound having a lower standard reduction potential than water are used in the reaction chamber. However, for the purpose of cytolysis only, a sample solution including NaCl can be added into the reaction chamber and the electrolysis is performed in the cathode to lyse cells.

A reaction or cathode chamber solution containing a compound that has a lower standard reduction potential than water is included in the cathode, and thus hydrogen gas and hydroxide ions are generated as a result of the electrolysis of water. A reaction or anode chamber solution containing a compound that has a lower standard reduction potential than water is included in the anode, and thus oxygen gas and hydrogen ions are generated as a result of the electrolysis of water. Therefore, the solution in the cathode has an alkaline pH and the solution in the anode has an acidic pH.

The present invention will be described in greater detail with reference to the following examples. The following examples are for illustrative purposes and are not intended to limit the scope of the invention.

EXAMPLE 1

Preparation of a Microfluidic Device for Regulating the pH

A microfluidic device for electrochemically regulating the pH of a fluid was prepared. The microfluidic device included: a cathode substrate which is formed of silicon doped with impurities; an anode substrate which is formed of silicon doped with impurities, facing the cathode substrate and forming a reaction chamber with the cathode substrate; and a nonconductor which forms a boundary between the cathode substrate and the anode substrate and prevents contact between the anode and the cathode, wherein the reaction chamber includes an ion exchange membrane by which the reaction chamber is divided into the cathode and anode chamber and a pillar structure capable of adsorbing biomolecular materials is formed inside the chamber of the cathode substrate.

Figure 7:
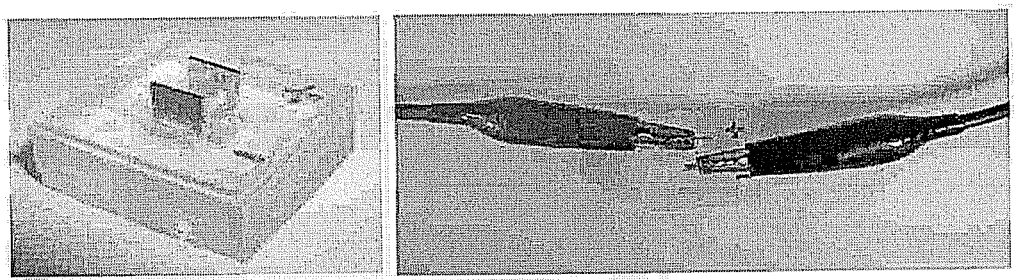
FIG. 7 is pictures of a microfluidic device prepared in Examples of the present invention.

In particular, each of the cathode and anode chambers of the microfluidic device had a volume of 10 microliters. A positive ion exchange membrane containing the functional group of —$SO_3^-Na^+$ was used as an ion exchange membrane. In addition, the cathode and anode substrates were formed of n-type silicon (resistivity<0.005 ohm-cm) doped with arsenic. the interior dimensions of the cathode and anode chambers was 2 mm×3 mm respectively. FIG. 7 is a photograph of a microfluidic device according to the present Example.

EXAMPLE 2

Preparation of a Microfluidic Device for Regulating the pH

A microfluidic device was prepared in the same manner as in Example 1, except that the cathode and anode substrates were formed of p-type silicon (resistivity<0.005 ohm cm) doped with boron.

EXAMPLE 3

Preparation of a Microfluidic Device for Regulating the pH

A microfluidic device was prepared in the same manner as in Example 1, except that the cathode substrate was formed of p-type silicon (resistivity<0.005 ohm cm) doped with boron and the anode substrate was formed of n-type silicon (resistivity<0.005 ohm cm) doped with arsenic.

EXAMPLE 4

Preparation of a Microfluidic Device for Regulating the pH

A microfluidic device was prepared in the same manner as in Example 1, except that the cathode substrate was formed of n-type silicon (resistivity<0.005 ohm cm) doped with arsenic and the anode substrate was formed of p-type silicon (resistivity<0.005 ohm cm) doped with boron.

EXAMPLE 5

Preparation of a Microfluidic Device for Regulating the pH

A microfluidic device was prepared in the same manner as in Example 1, except that the cathode substrate was formed of n-type silicon (resistivity<0.005 ohm cm) doped with arsenic and the anode substrate was formed of a nonconductor including 2 mm×3 mm platinum inside the chamber.

EXAMPLE 6

Preparation of a Microfluidic Device for Regulating the pH

A microfluidic device was prepared in the same manner as in Example 1, except that the cathode substrate was formed of p-type silicon (resistivity<0.005 ohm cm) doped with boron and the anode substrate was formed of a nonconductor including 2 mm×3 mm platinum inside the chamber.

EXPERIMENTAL EXAMPLE 1

Measurement of Current Intensity of the Microfluidic Device According to Applied Voltages The current intensities according to a constantly applied voltage were measured using the microfluidic device prepared in Examples 1, 2, 5 and 6. The current intensity is relative to the pH change.

That is, the cathode and anode chambers of the microfluidic device prepared in Examples 1, 2, 5 and 6 were filled with 55 mM $Na_2SO_4$ water solution and DC voltages of 5 V, 7 V, 9 V and 12 V were applied thereto at room temperature and the current between the anode and cathode substrates was measured.

Figure 8:
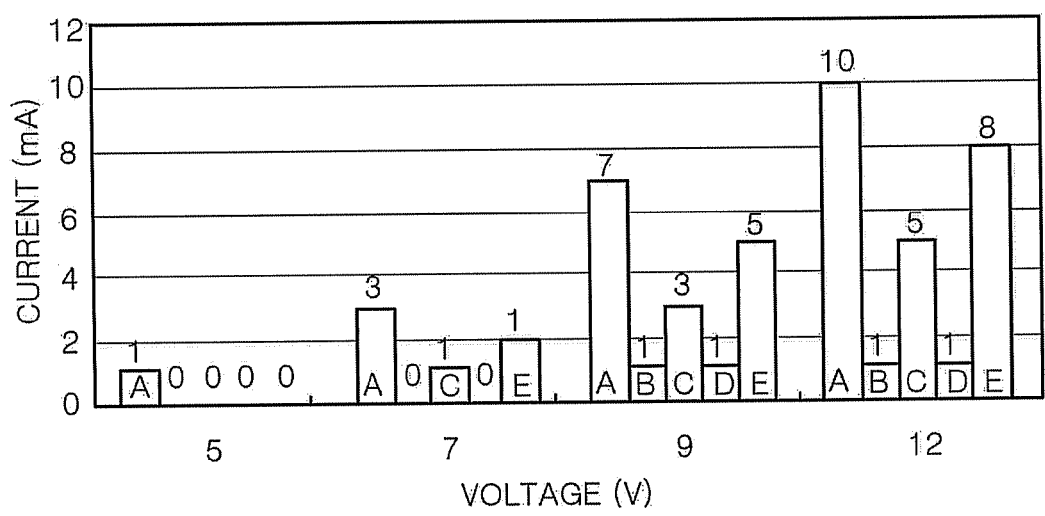
FIG. 8 is a graph illustrating amperage of microfluidic devices according to types of cathode and anode electrodes according to the applied voltages in an embodiment of the present invention, where (A: anode (Pt)/cathode (Pt), B: anode (n-type Si)/cathode (n-type Si), C: anode (p-type Si)/cathode (p-type Si), D: anode (Pt)/cathode (n-type Si), E: anode (Pt)/cathode (p-type Si))

FIG. 8 is a graph illustrating amperage of microfluidic devices according to types of cathode and anode electrodes according to the applied voltages. In FIG. 8, A is a result of a control microfluidic device (anode (Pt)/cathode (Pt)), B is a result of the microfluidic device of Example 1 (anode (n-type Si)/cathode (n-type Si)), C is a result of the microfluidic device of Example 5 (anode (p-type Si)/cathode (p-type Si)), D is a result of the microfluidic device of Example 2 (anode (Pt)/cathode (n-type Si)), and E is a result of the microfluidic device of Example 6 (anode (Pt)/cathode (p-type Si)).

The current intensity was measured using a current measuring device of the Agilent E3620A Dual output DC power supply. The current measuring device measures current in units of 1 mA, and thus amperage under 1 mA is indicated as 0 mA.

As illustrated in the FIG. 8, when a voltage higher than 7 V was applied, the current was formed in the microfluidic device of Examples 5 and 6. When a voltage higher than 9 V was applied, the current was formed in the microfluidic device of Examples 1 and 2.

Accordingly, all microfluidic devices prepared in Examples 1, 2, 5 and 6 show sufficient current intensities in spite of showing minute differences. Thus, the microfluidic device can effectively be used for regulating the pH in a fluid using electrolysis.

EXPERIMENTAL EXAMPLE 2

Measurement of the pH Change of the Microfluidic Device

The pH change was measured using the microfluidic device prepared in Examples 1, 2, 5 and 6.

That is, the cathode and anode chambers of the microfluidic device prepared in Examples 1, 2, 5 and 6 were filled with 55 mM sodium sulfonate ($Na_2SO_4$) water solution and DC voltages of 5 V, 7 V, 9 V and 12 V were applied thereto at room temperature for 40 seconds and the pH of the chambers was measured. The initial solution had a pH of 7.

Figure 9A:
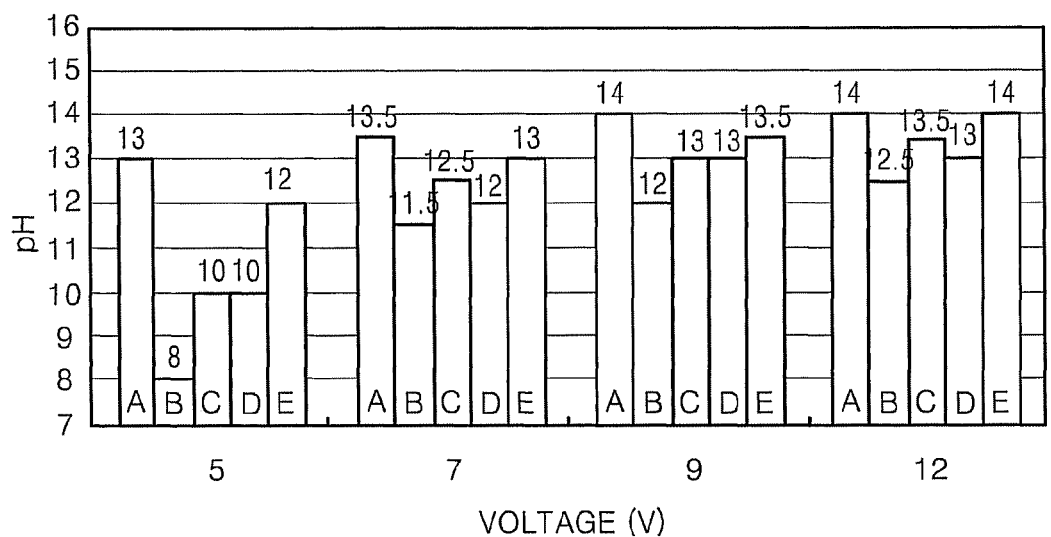
FIG. 9A is a graph illustrating a pH of the cathode chamber of the microfluidic device of FIG. 4 after applying voltages thereto according to an embodiment of the present invention (A: anode (Pt)/cathode (Pt), B: anode (n-type Si)/cathode (n-type Si), C: anode (p-type Si)/cathode (p-type Si), D: anode (Pt)/cathode (n-type Si), E: anode (Pt)/cathode (p-type Si))
Figure 9B:
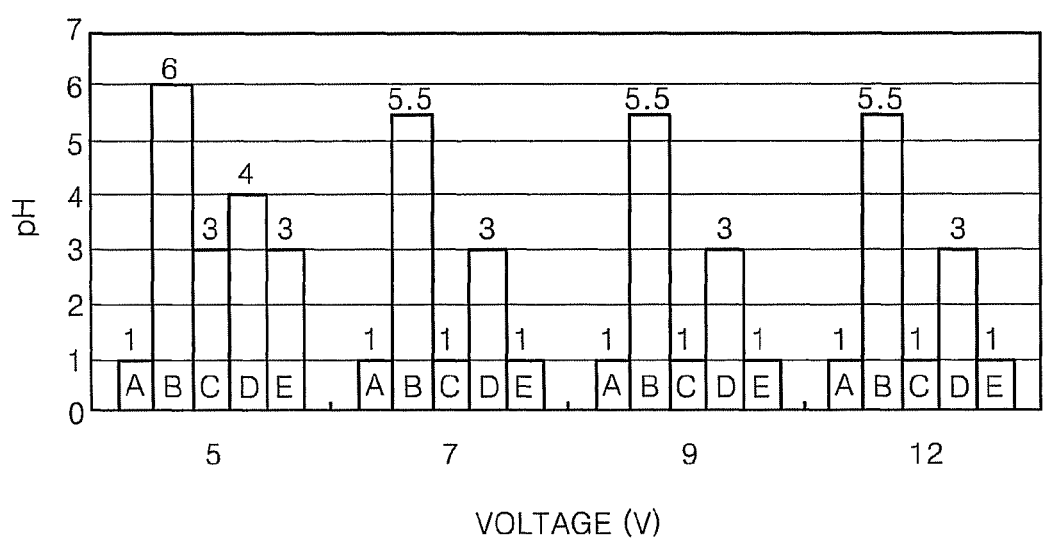
FIG. 9B is a graph illustrating a pH of the anode chamber of the microfluidic device of FIG. 4 after applying voltages thereto according to an embodiment of the present invention (A: anode (Pt)/cathode (Pt), B: anode (n-type Si)/cathode (n-type Si), C: anode (p-type Si)/cathode (p-type Si), D: anode (Pt)/cathode (n-type Si), E: anode (Pt)/cathode (p-type Si))

The results are illustrated in the FIGS. 9A and 9B. FIG. 9A is a graph illustrating the pH of the cathode chamber of the microfluidic device measured after applying voltages thereto. FIG. 9B is a graph illustrating the pH of the anode chamber of the microfluidic device measured after applying voltages thereto. A, B, C, D and E in FIGS. 9A and 9B are the same as FIG. 8.

In FIG. 9A, the pH of the cathode chamber increased from pH 7.0 to a pH between 8.0 to 14.0 as a result of the application of the voltages of 5 to 12 V. Particularly, when a voltage of 7 V or higher was applied, the pH was 12 or higher which is sufficient for cytolysis. In FIG. 9B, the pH of the anode chamber decreased from pH 7.0 to a pH between 1.0 to 5.5 as a result of the application of the voltages of 5 to 12 V. In the graph illustrating B, which is a result of the microfluidic device of Example 1 (anode (n-type Si)/cathode (n-type Si)), the pH was hardly changed, and bubbles could hardly be seen.

As a result, all microfluidic devices prepared in Examples 1, 2, 5 and 6, particularly the microfluidic devices of Examples 5 and 6, can effectively regulate the pH in solutions of the chambers.

EXPERIMENTAL EXAMPLE 3

Test of DNA Stability in a Microfluidic Device

DNA stabilities, that is, DNA absorption degree in the cathode of the microfluidic device prepared in Examples were compared.

First, the cathode and anode chambers of the microfluidic device prepared in Examples 5 and 6 were filled with 55 mM $Na_2SO_4$ water solution and $5\times10^4$ copies/chamber of E. coli (BL21, Stratagen) culture was added into each cathode chamber. Then, a DC voltage of 5 V was applied thereto at room temperature for 40 seconds to perform electrolysis.

The microfluidic device using platinum as the cathode and the microfluidic device using DNA not performing electrolysis are compared as the control groups.

Quantitative PCR was performed using the obtained solution as a template and the absorption degree of DNA eluted from lysed cells in the cathode was measured. Forward and reverse primers were used (FP: 5'-YCCAKACTCCTACGG-GAGGC-3', RP: 5'-GTATTACCGCRRCTGCTGGCAC-3').

DNA was quantified by obtaining a cross point (Cp) value through the quantitative PCR. A lower Cp value indicates a larger amount of DNA.

Figure 10:
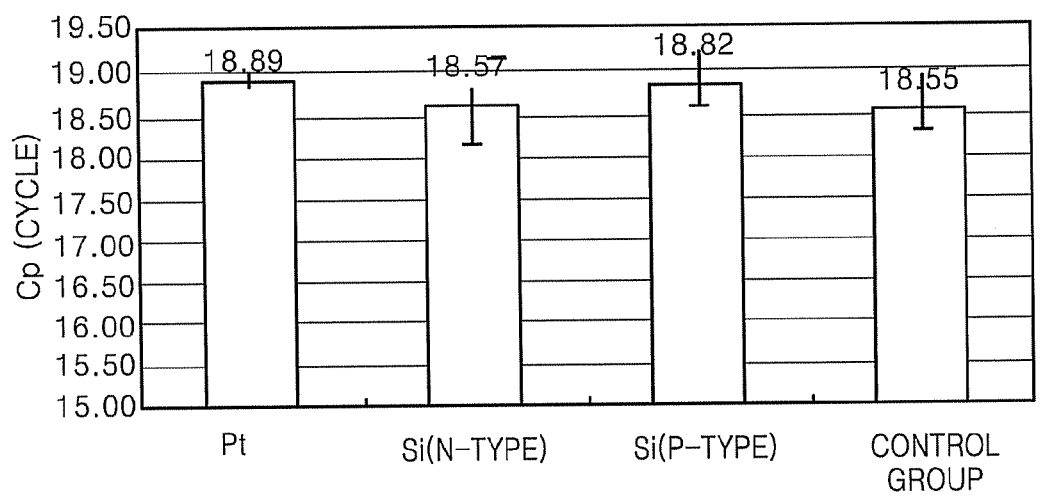
FIG. 10 is a graph of DNA stability in the cathode according to the type of the cathode electrode of the microfluidic device of FIG. 4.

FIG. 10 is a graph of DNA stability in the cathode according to the type of the cathode electrode of a microfluidic device according to Examples 4 and 5.

As illustrated in the FIG. 10, Cp levels of the microfluidic device according to an embodiment of the present invention are not quite distinct from those of control groups. As a result, DNA stability using the microfluidic device according to an embodiment of the present invention can be concluded to be excellent.

EXPERIMENTAL EXAMPLE 4

Test of Cytolysis Using a Microfluidic Device

Cytolysis which is one of a series of biological analytic processes was performed using the microfluidic device prepared in Examples.

First, the cathode and anode chambers of the microfluidic device prepared in Examples 1 through 4 were filled with 55 mM $Na_2SO_4$ water solution and $10^5$ cells/chamber of E. coli (BL21, Stratagen) culture was added into each cathode chamber. The microfluidic device using platinum as the cathode and anode and the microfluidic device not performing electrolysis are compared as the control groups.

Then a DC voltage of 5 V was applied to the microfluidic device of Examples 1 through 4 and 5 V and 9 V were applied to the microfluidic device using platinum as the cathode and anode at room temperature for 40 seconds to perform electrolysis.

Quantitative PCR was performed using the obtained solution as a template and the absorption degree of DNA eluted from lysed cells in the cathode was measured. Forward and reverse primers were used (FP: 5'-YCCAKACTCCTACGG-GAGGC-3', RP: 5'-GTATTACCGCRRCTGCTGGCAC-3').

Figure 11:
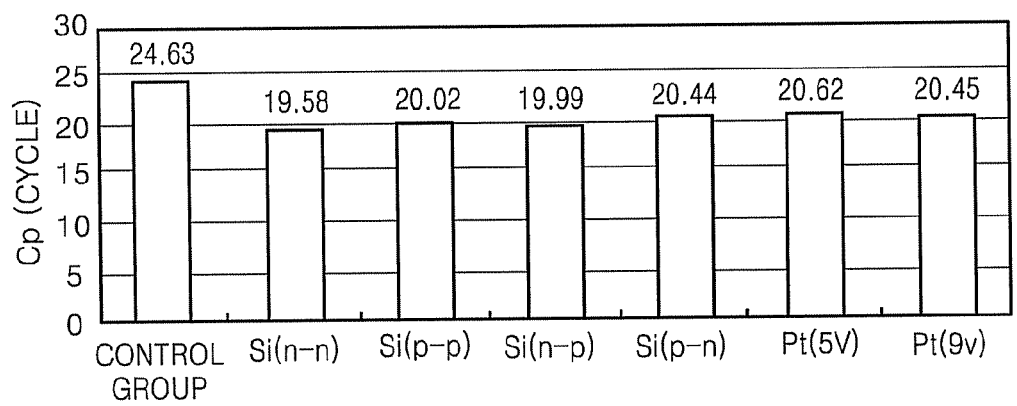
FIG. 11 is a graph of cytolysis in the cathode chamber according to the type of the cathode and anode electrodes of the microfluidic device of FIG. 4.

DNA was quantified by obtaining a cross point (Cp) value through the quantitative PCR. A lower Cp value indicates a larger amount of DNA. That is because a large initial amount of DNA accelerates the detection. FIG. 11 is a graph of cytolysis in the cathode chamber according to the type of the cathode and anode electrodes of a microfluidic device according to an embodiment of the present invention.

As illustrated in the FIG. 11, Cp levels of the microfluidic devices according to an embodiment of the present invention are almost similar to those of control groups. pH regulation in chambers can effectively be performed using the microfluidic device, and a series of biological analytic processes that need to regulate the pH of a fluid such as cytolysis can effectively be performed.

The microfluidic device of the present invention does not need additional electrodes and an electrical connection between the electrodes and the external power supply device. Thus the microfluidic device can be miniaturized, the manufacturing process can be simplified, the problem of leakage in chambers can be solved and the costs for manufacturing the microfluidic device can be reduced. The microfluidic device of the present invention can integrate various biological analytic processes and can easily be manufactured by including a microstructure capable of adsorbing biomolecular materials. According to the present invention, the pH of a fluid in the microfluidic device can easily be regulated and/or the biomolecular materials can effectively be concentrated.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A microfluidic device for cytolysis comprising:
a cathode substrate which functions as a cathode and includes a semiconductor doped with impurities;
an anode substrate which functions as an anode and includes a semiconductor doped with impurities or a metal electrode, wherein the anode substrate faces the cathode substrate and forms a reaction chamber with the cathode substrate; and
a nonconductor between the cathode substrate and the anode substrate, wherein the nonconductor contacts the cathode and anode substrates,
wherein a microstructure capable of adsorbing biomolecular materials is formed on the cathode substrate inside the reaction chamber.

2. The microfluidic device of claim 1, wherein the microstructure capable of adsorbing biomolecular materials is selected from the group consisting of a pillar structure, a sieve structure and a porous structure.

3. The microfluidic device of claims 1, wherein the reaction chamber comprises an ion exchange membrane by which the reaction chamber is divided into the cathode chamber and the anode chamber.

4. A method of electrochemically regulating the pH of a fluid in the microfluidic device according to claim 1, the method comprising:
injecting a solution containing ions having a lower or higher standard oxidation potential than water along with other ions having a lower standard reduction potential than water into the reaction chamber;
applying a voltage through the anode substrate and the cathode substrate and inducing electrolysis in the reaction chamber; and
regulating the pH of a solution in the reaction chamber.

5. The method of claim 4, wherein the solution comprises biomolecular materials and the method further comprises adsorbing and concentrating biomolecular materials in the microstructure before applying the voltage.

6. The method of claim 4, wherein the ions having a lower standard oxidation potential than water are at least one selected from the group consisting of $NO_3^-$, $F^-$, $SO_4^{2-}$, $PO_4^{3-}$ and $CO_3^{2-}$ ions.

7. The method of claim 4, wherein the ions having a higher standard oxidation potential than water are $Cl^-$ ions.

8. The method of claim 4, wherein the ions having a lower standard reduction potential than water are at least one selected from the group consisting of $Na^+$, $K^+$, $Ca^{2+}$, $Mg^{2+}$ and $Al^{3+}$ ions.

9. The method of claim 4, wherein the regulation of the pH depends on at least one of the direction, magnitude and period of the applied voltage, and the width of the electrodes.

10. A method of electrochemically regulating the pH of a fluid in the microfluidic device according to claim 3, the method comprising:
injecting a solution containing ions having a lower or higher standard oxidation potential than water into the anode chamber;
injecting a solution containing ions having a lower standard reduction potential than water into the cathode chamber;
applying a voltage through the anode substrate and the cathode substrate and inducing electrolysis in the anode chamber and the cathode chamber; and
regulating the pH of a solution in the anode or cathode chamber.

11. The method of claim 10, wherein the solution comprises biomolecular materials and the method further comprises adsorbing and concentrating biomolecular materials in the microstructure before applying the voltage.

12. The method of claim 10, wherein the regulation of the pH depends on at least one of the direction, magnitude and period of the applied voltage, the width of the electrodes, and the intervals between the anode chamber and cathode chamber.

* * * * *